INVENTOR
JOHN ZUERCHER
ATTORNEY

May 14, 1963 J. ZUERCHER 3,089,701
PIN CONVEYING MECHANISM
Filed Jan. 19, 1961 4 Sheets-Sheet 2
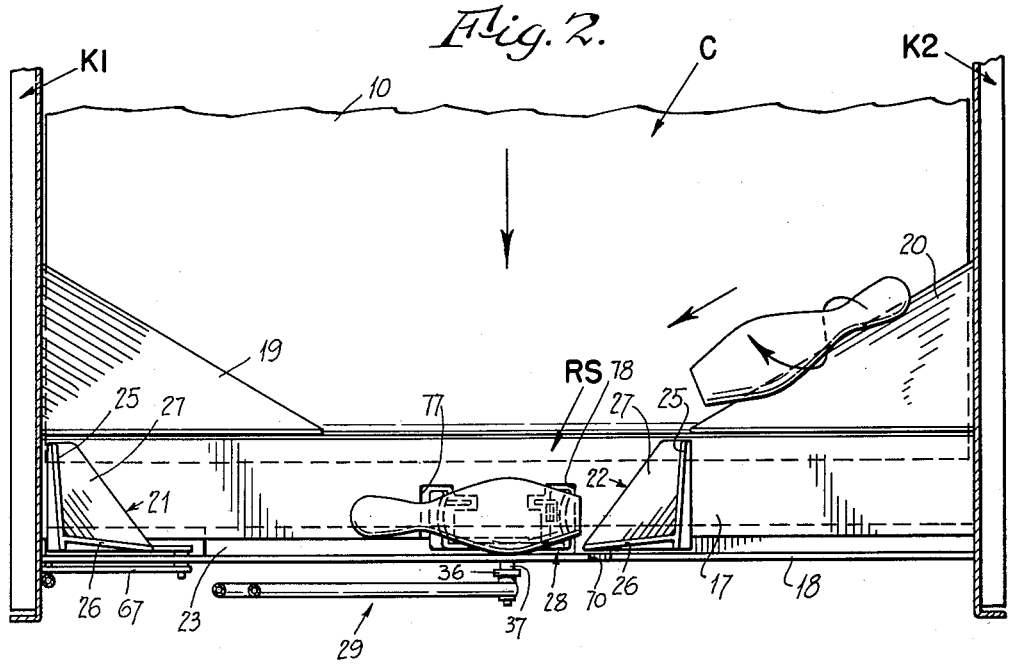
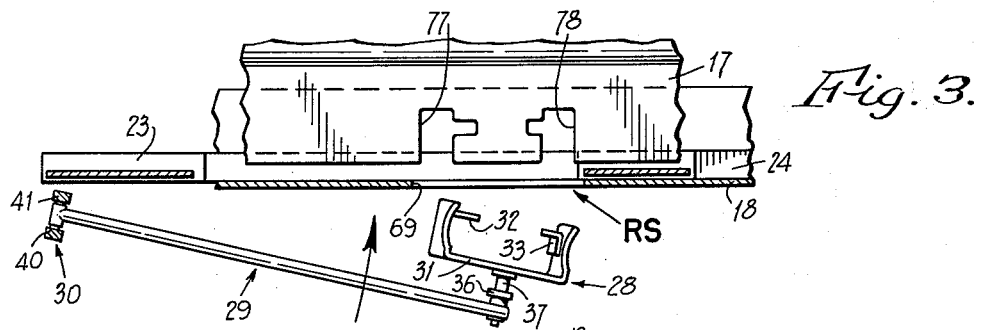
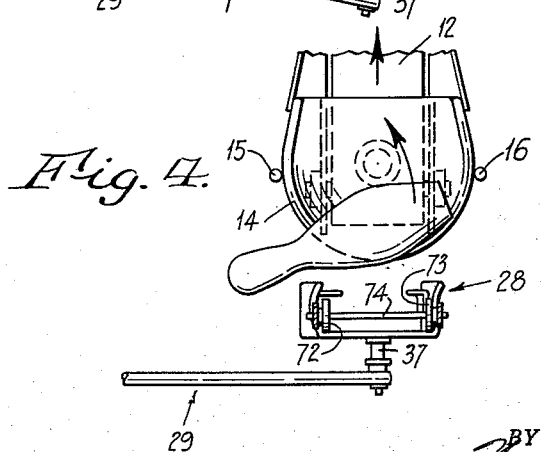
INVENTOR
JOHN ZUERCHER
BY
ATTORNEY

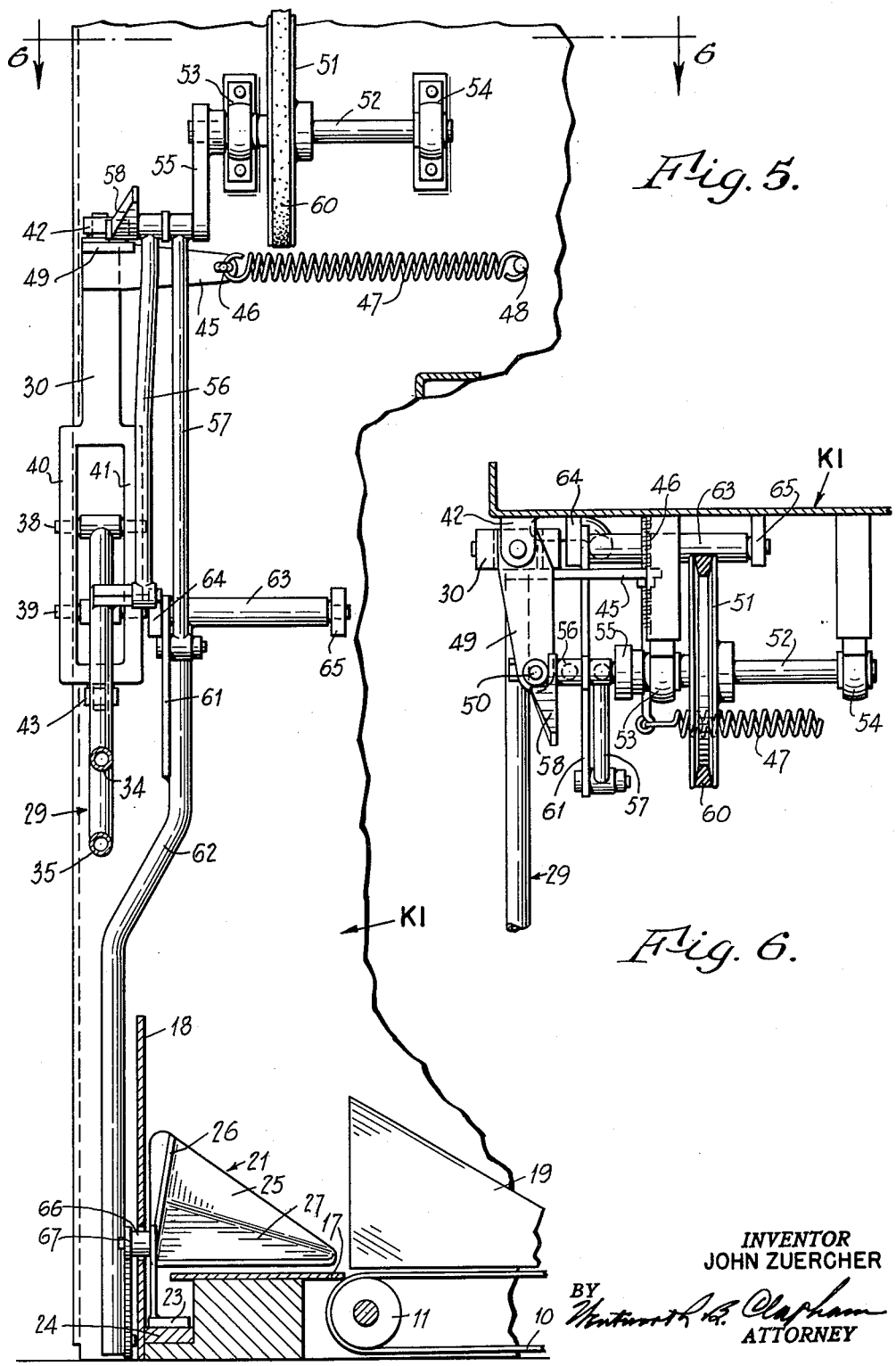

May 14, 1963 J. ZUERCHER 3,089,701
PIN CONVEYING MECHANISM
Filed Jan. 19, 1961 4 Sheets-Sheet 4

INVENTOR
JOHN ZUERCHER
ATTORNEY

United States Patent Office 3,089,701
Patented May 14, 1963

3,089,701
PIN CONVEYING MECHANISM
John Zuercher, Mansfield, Ohio, assignor to American Machine & Foundry Company, a corporation of New Jersey
Filed Jan. 19, 1961, Ser. No. 83,669
12 Claims. (Cl. 273—43)

This invention relates to bowling pin spotting machines and, more particularly, to apparatus for gathering pins which have fallen into the pit adjacent one end of an alley and elevating the pins to a discharge station for ultimate transfer to a pin spotter.

Bowling pin spotting machines are mounted at the pit end of a bowling alley and generally include a pin spotter which spots pins on the alley and means for gathering bowling pins which have fallen into the pit and delivering such pins to the pin spotter. Since the pin spotter is arranged above the bottom of the pit, and above the alley, the above-mentioned means also includes a pin elevator for elevating the pins from the bottom of the pit.

One of the objects of this invention is to provide novel apparatus for gathering bowling pins which have fallen into the pit of the alley and elevating such pins to a discharge station spaced above the bottom of the pit.

Another object is to provide novel and improved means for elevating pins, one at a time, from a pin receiving station in the pit, to a pin discharge station spaced above the pin receiving station.

A further object is to provide a novel pin elevator which is inexpensive, operates at a low noise level, and requires a relatively small amount of power for operation.

Still another object is to provide improved means for delivering pins, which have fallen into the pit, to a pin receiving station from which the pins are elevated to a pin discharge station.

In order that the manner in which these and other objects are attained in accordance with the invention can be understood in detail, reference is had to the accompanying drawings, which form a part of this specification, and wherein:

FIGURE 2 is a top plan view, taken on line 2—2, FIGURE 1, of a portion of the apparatus shown in FIGURE 1;

FIGURE 3 is a view, similar to FIGURE 2, illustrating the position of the pin cradle immediately prior to movement into the pin receiving station;

FIGURE 4 is a top plan view, taken on line 4—4, FIGURE 1, illustrating the position of a bowling pin as it is discharged at the discharge station;

FIGURE 5 is a side elevational view, partly in section, taken on line 5—5, FIGURE 1;

Figure 1:
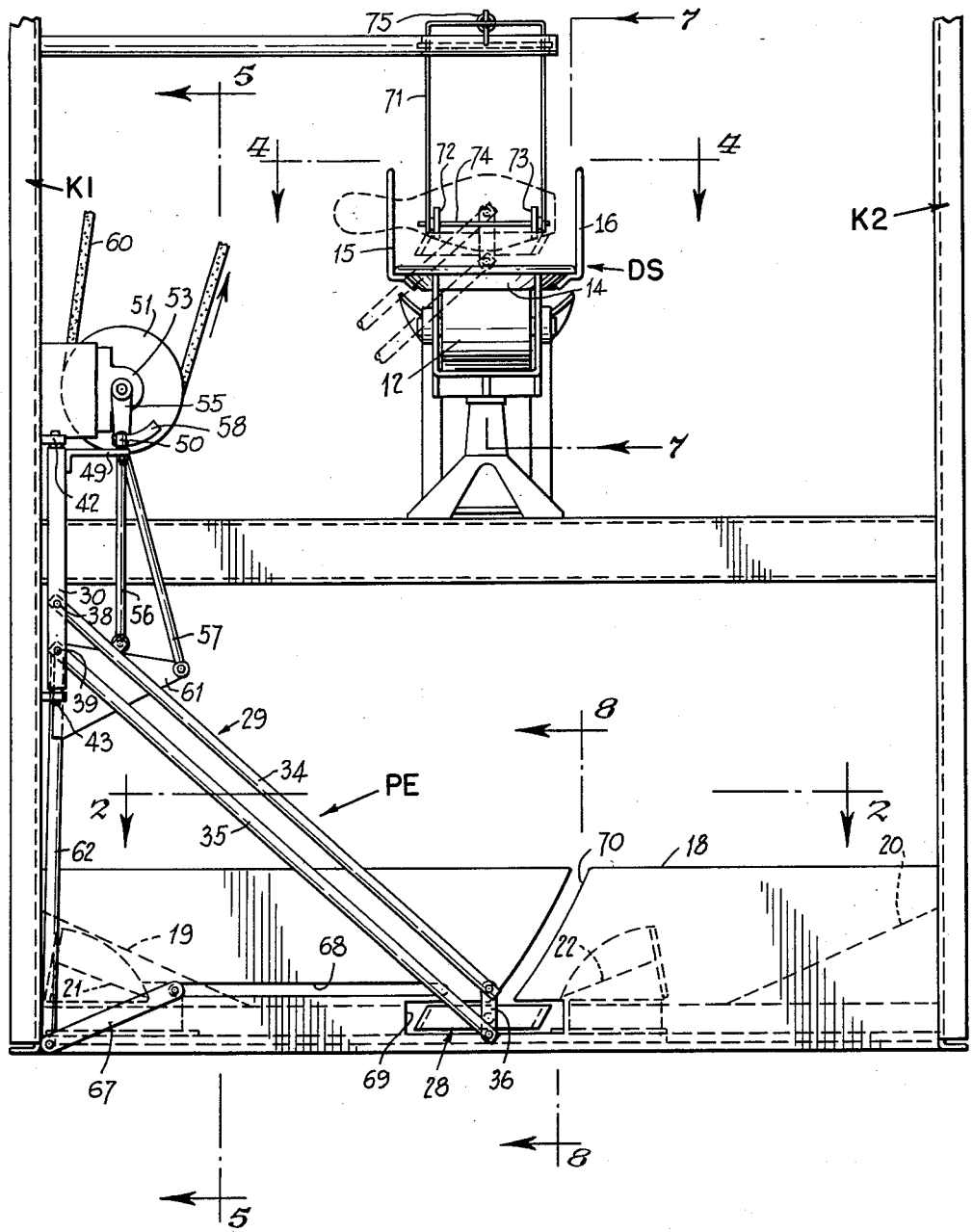
FIGURE 1 is a rear elevational view of an apparatus constructed in accordance with one embodiment of this invention.
Figures 7, 8:
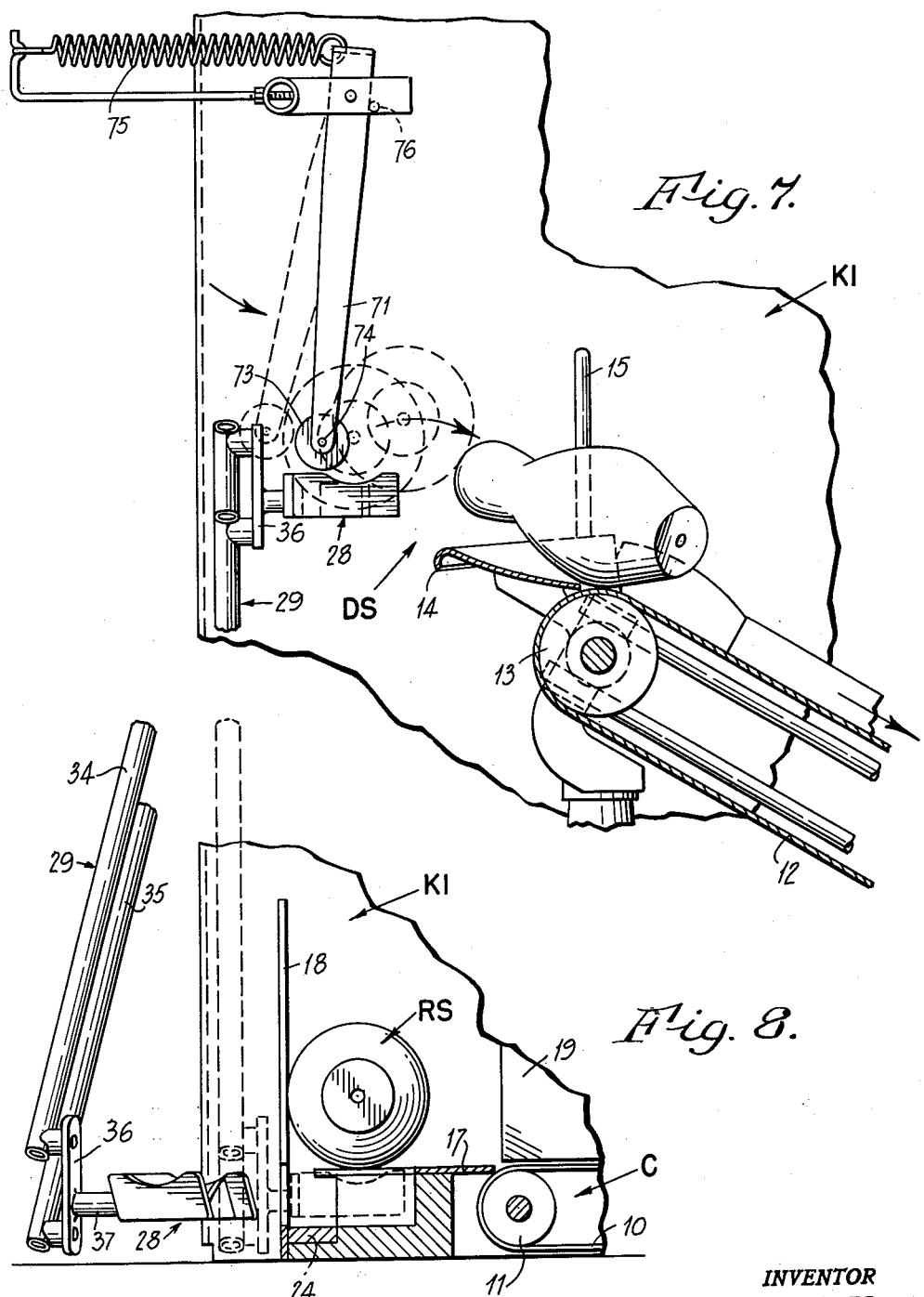

FIGURE 6 is a top plan view, partly in section, taken on line 6—6, FIGURE 5; and FIGURES 7 and 8 are side elevational views, partly in section and with portions removed, taken on lines 7—7 and 8—8, FIGURE 1, respectively, FIGURES 5–8 being on an enlarged scale, relative to that of FIGURES 1–4, for clarity of illustration.

Referring now to the drawings, the embodiment here illustrated comprises a pair of vertical, parallel kickbacks K1 and K2, a conveyor C and a pin elevator PE for elevating pins from a pin receiving station RS to a pin discharge station DS. Kickbacks K1 and K2 extend along the sides of the rear end of the alley and the pit, in the usual fashion.

Conveyor C comprises a continuously driven, endless belt 10 which passes over a pulley 11 located toward the rear of the pit. Although only the rear portion of belt 10 is shown in the drawings, it is to be understood that the belt also passes over another pulley (not shown) located toward the front of the pit, the belt being driven so that its upper run travels toward the rear of the pit. The width of belt 10 is substantially the same as the distance between kickbacks K1 and K2. Conveyor C extends along the bottom of the pit below the upper surface of the alley so that pins, which fall or are swept into the pit from the alley, come to rest on the upper run of belt 10 and are carried toward the rear of the pit. The upper and lower runs of belt 10 are shown in a horizontal position but they can be inclined toward the rear of the pit to facilitate movement of the pins in that direction.

At discharge station DS is mounted a pin receiving and aligning device similar to that shown in Patent 2,767,983 to Holloway et al. This device includes an inclined conveyor belt 12 which passes over a pulley 13 and is driven so that the upper run thereof moves toward the front of the pit. Mounted above pulley 13 and adjacent the rear of belt 12 is a pan 14 and a pair of vertical posts 15 and 16 located on either side of the pan. Posts 15 and 16 are operative to align each bowling pin, as it is discharged at the discharge station onto 14, so that the pin is carried butt end first on belt 12 for ultimate transfer to a pin spotter (not shown).

An elongated flat plate 17 extends transversely of the pit between kickbacks K1 and K2 at the rear of conveyor C, plate 17 being mounted in a horizontal plane substantially coplanar with the rear of the upper run of belt 10 to form an apron or stationary extension of the belt onto which pins are delivered. Spaced to the rear of plate 17 is an elongated flat plate 18 which also extends transversely of the pit between kickbacks K1 and K2 and which lies in a vertical plane. The plane of plate 17 intersects plate 18 along a line intermediate the upper and lower edges of plate 18, plate 18 extending above plate 17 for a distance substantially greater than the dimension of a bowling pin so that the bowling pins cannot move towards the rear of the pit beyond plate 18.

A pair of inclined triangular plows 19 and 20 are fixedly secured to kickbacks K1 and K2 immediately above the rear corners of the upper run of belt 10, the plows being arranged so that bowling pins which are carried by the belt into engagement with the plows are directed along the forward edges of the plows toward the center of the belt and toward the pin receiving station RS, station RS being located in front of the center of plate 18 and above the center of plate 17. Plows 19 and 20 are each mounted in front of plate 17 to provide a space at their rear in which a pair of shuttles 21 and 22 can move, the plows being high enough to prevent pins from rolling over and behind them and thereby interfering with movement of shuttles 21 and 22. As seen in FIG. 2, movement of belt 10 causes a pin which abuts the forward edge of one of the plows to rotate in the direction of the arrow and at the same time slide along the forward edge of the plow toward the center of the belt.

Shuttles 21 and 22 are rigidly affixed to and are carried by a sliding bar 23 which is slidable along the top surface of a way 24 located in front of plate 18 and beneath the rear edge of plate 17, the way extending substantially across the entire width of the pit. Shuttles 21 and 22 and sliding bar 23 are movable as a unit and are operative to push pins on either side of the receiving station RS into the receiving station. The shuttles are spaced apart by a distance greater than one-half the width of the pit and are so arranged, relative to the plow, that none of the bowling pins can move behind the plows and the shuttles.

Each of the shuttles includes a side plate 25, a rear plate 26 and a bottom plate 27, the bottom and rear plates of each shuttle extending from its associated side plate toward the center of the belt and toward receiving station RS. This arrangement of the shuttles and the motion of the conveyor, along with the action of the plows, causes the bowling pins to be directed into the receiving station RS. Each pin, as it is moved into receiving station RS, comes into engagement with plate 18 and extends generally transversely of the pit.

Pin elevator PE includes a cradle 28 connected to one end of lever means 29 having its other end pivotally mounted in a yoke 30. Cradle 28 comprises a U-shaped body 31 which lies in a horizontal plane, the sides or legs of the body pointing toward the front of the pit. Connected each to a different one of the legs of body 31 are L-shaped members 32 and 33, these members being so mounted that the free legs thereof point toward each other, as best seen in FIG. 2. The legs of body 31 are each provided with an arcuate recess which faces upwardly and the free legs of members 32 and 33 are inclined toward the center, so that a pin can be supported upon the cradle. The cradle is operative, upon upward movement through the receiving station, to pick up and support a pin in a horizontal position while elevating such pin to the discharge station DS.

Lever means 29 includes a pair of identical arms 34 and 35 connected at adjacent ends to a link 36 for pivotal movement, relative to the link, about horizontal axes. Cradle 28 is rigidly affixed to link 36 by means of a connecting pin 37. The other ends of arms 34 and 35 are pivotally mounted upon a pair of parallel horizontal pins 38 and 39, the spacing of pins 38, 39 being substantially equal to the spacing of the other ends of arms 34 and 35 so that the arms extend parallel to each other. Thus, movement of either of arms 34 or 35 causes the other arm and link 36 to move. However, since pins 38 and 39 are fixed, link 36 remains in a vertical position, so that cradle 28 remains horizontal during such movement.

Yoke 30 includes a pair of medially located, spaced portions 40 and 41 to which the ends of pins 38 and 39 are connected, portions 40 and 41 straddling the ends of arms 34 and 35 connected to pins 38 and 39. Yoke 30 is mounted in a vertical position and has its upper and lower ends supported in a pair of bearings 42 and 43, respectively, the bearings being spaced vertically so that the yoke pivots about a vertical axis. Bearings 42 and 43 are rigidly affixed to kickback K1.

An arm 45 is rigidly fixed to the upper end of yoke 30 and carries at its forward end an adjustable stop screw 46. As best seen in FIGURE 6, stop screw 46 extends through arm 45 in a direction generally perpendicular to kickback K1, the screw being engageable with the kickback to limit rotation of the yoke in one direction. The other end of stop screw 46 is connected to a helical tension spring 47 which, in turn, is connected to a stationary stud 48, the spring being operative to bias yoke 30 in a counterclockwise direction as viewed in FIGURE 6. Also rigidly fixed to the upper end of yoke 30 is a second arm 49 which extends transversely of the pit and carries at its outer end a cam follower 50. Arms 45 and 49 extend generally perpendicular to each other.

A driven pulley 51 is mounted on a rotatable shaft 52 supported horizontally by a pair of bearings 53 and 54. Shaft 52 extends parallel to the plane of kickback K1 and is keyed, at its rear end, to a crank arm 55. At its outer end, crank arm 55 is pivotally connected to a pair of links 56 and 57, and is rigidly affixed to an arcuate cam 58. Pulley 51 carries a belt 60 which is driven in the direction of the arrow, as shown in FIGURE 1, so that pulley 51 rotates in a counterclockwise direction. Link 56 has its other end connected to arm 34 (toward the end thereof connected to yoke 30), so that, as pulley 51, shaft 52 and crank arm 55 rotate, lever means 29 is moved or driven in the manner described hereafter. The other end of link 57 is pivotally connected to a triangular plate 61 which lies in a vertical plane substantially perpendicular to the plane of kickback K1, the point of connection being adjacent the apex of the triangle of the plate. The base of plate 61 is rigidly fixed to an arm 62 which, at its upper end, is mounted for rotation about a horizontal shaft 63 supported by a pair of bearings 64 and 65, the bearings being so located that shaft 63 extends parallel to kickback K1. The other end of arm 62 is pivotally connected to a link 67 which in turn is connected via a pin 66 to shuttle 21. Plate 18 is provided with an elongated horizontal slot 68 through which pin 66 extends. Beneath and to the rear of bowling pin receiving station RS, plate 18 is provided with a horizontal, rectangular aperture 69 of such size that cradle 28 can pass through the plate. Plate 18 is further provided with an arcuate slot 70 which extends upwardly from aperture 69 and is sufficiently wide to allow connecting pin 37 to pass upwardly therethrough.

A kickoff device is mounted adjacent to discharge station DS and is operative to push bowling pins from cradle 28 into pan 14 when the cradle carries a pin into the discharge station. In the embodiment illustrated, the kickoff device comprises a U-shaped lever 71 mounted for pivotal movement about a horizontal axis extending transversely of the pit. The lower ends of the arms of lever 71 carry an axle 74 having a pair of rollers 72 and 73 mounted thereon. As shown in FIGURE 7, a spring 75 is mounted to bias lever 71 against stop means 76. The kickoff device is arranged so that, when the cradle lifts a bowling pin into the discharge station, rollers 72, 73 engage the rear face of the pin and cam over the rear face until such time as the pin is pushed from the cradle into the pan, whereupon lever 71 moves into engagement with stop means 76. Plate 17 is provided with a pair of slots 77 and 78 which are shaped to provide for passage of cradle 28 from a position beneath plate 17.

In operation, belt 60 is continuously driven, as by an electric motor (not shown), so that the pin elevator PE is cyclically operated to elevate pins, one at a time, from the pit to distributor D. Immediately prior to the beginning of the upward movement of cradle 28, the apparatus is in the position shown in FIGURE 1. Assuming that bowling pins have fallen or been swept into the pit and have been carried by conveyor C to the pin receiving stations RS, in the manner previously described, and that a pin lies immediately above the cradle, the operation is as follows. Rotation of pulley 51 and shaft 52 causes crank arm 55 to swing from the dependent position shown in FIG. 1. As the free end of crank arm 55 swings upwardly, it carries with it link 56 and thereby causes lever means 29 to swing upwardly. Spring 47 biases stop screw 46 and yoke 30 so that the upward swinging movement of lever means 29 occurs in a vertical plane transversely of the pit. As cradle 28 is swung upwardly, it passes through slots 77 and 78 in plate 17 and picks up a bowling pin at station RS. As the cradle elevates the pin into the discharge station and moves through its apogee, the kickoff device pushes the pin from the cradle into pan 14. The pin, as it moves into the pan, will engage one of posts 15 or 16, depending upon the direction in which the head of the pin points, and as the pin moves onto belt 12, the post aligns the delivered pin so that it moves butt end first down the belt.

Continued rotation of crank arm 55 causes lever means 29 to lower the cradle from the discharge station. Cam 58 is arranged so that it engages cam follower 50 as cradle 28 moves toward the top of plate 18 and rotates yoke 30 so that the cradle 28 is swung to the rear of plate 18. The cam is further arranged so that, when cradle 28 lies opposite aperture 69, the cam follower falls from the cam, under the bias of spring 47, and moves the cradle, as shown in FIGURE 3, through the aperture into the position shown in FIGURE 1. Continued rotation of pulley 51 causes this cycle to be repeated.

A pin spotting machine constructed in accordance with the foregoing description possesses several advantages. First, all of the parts are relatively simple and can be made extremely durable. Additionally, the pin elevator does not depend upon any particular coefficient of friction between the material of the bowling pin and that of the cradle. During the elevating stroke, the displacement of the cradle above the bottom of the pit is sinusoidal so that the cradle does not move into engagement with the bowling pin, at the pin receiving station RS, with a great velocity. Thus, when the cradle picks up a pin, relatively little noise is produced and the pin is not damaged. Furthermore, since only one pin is being moved at any given instant of time between the stations, the pin elevator can be operated with a less powerful driving mechanism than would be the case if several pins were in a transit at the same time.

While only a single embodiment of the invention has been shown, it will be obvious to those skilled in the art that many changes can be made in both the details and in the arrangement of parts without departing from the scope of the invention as defined in the appended claims.

What is claimed is:

1. In a bowling pin spotting machine for use with a bowling alley having a pit at one end, the combination of:
   means in the pit for delivering pins which have fallen into the pit to a pin receiving station;
   a pin discharge station located above said pin receiving station;
   and a pin elevator for elevating pins from said pin receiving station to said pin discharge station, said pin elevator comprising
      a pin holder comprising a cradle adapted to support a pin in a horizontal position,
      arm means connected to said cradle and arranged in the form of a parallelogram to maintain said cradle in a horizontal position during elevation of a pin,
      and cyclically operable driving means connected to move said pin holder, upon each cycle of operation, between said pin receiving station and said pin discharge station to elevate pins, one at a time from said pin receiving station to said pin discharge station.

2. A bowling pin spotting machine in accordance with claim 1 and including a pin kickoff disposed adjacent to said discharge station and operative to discharge a pin from said cradle into said discharge station.

3. In a bowling pin spotting machine for use with a bowling alley having a pit at one end thereof, the combination of elongated plate means extending across the pit toward the rear thereof and including a first portion which lies in a vertical plane for limiting rearward movement of bowling pins in said pit and a second portion which lies in a horizontal plane for supporting bowling pins thereon; a pin receiving station located in front of said first portion at the center thereof and along the longitudinal center line of the pit; a driven conveyor belt disposed in said pit and operative to move pins toward said plate means and said pin receiving station, said second portion of said plate means lying substantially coplanar with the discharge end of said conveyor belt; means for directing pins into said pin receiving station; and a pin elevator for elevating pins from said pin receiving station to said pin discharge station, said pin elevator including a cradle adapted to pick up a pin at said pin receiving station and to discharge the pin thus picked up at said pin discharge station, arm means pivotally mounted at one end and connected at the other end to said cradle, and driving means operatively connected for moving said arm means and said cradle to elevate pins, one at a time, from said pin receiving station to said pin discharge station.

4. A bowling pin spotting machine in accordance with claim 3 wherein said driving means includes a driven shaft, a crank arm mounted on said shaft, and a link interconnecting said crank and said arm means whereby said cradle is moved in response to rotation of said shaft.

5. A bowling pin spotting machine constructed in accordance with claim 3 wherein said first portion of said plate means is provided with a substantially vertically extending arcuate slot and an aperture, said second portion being provided with a pair of slots, said cradle being substantially U-shaped and lying in a generally horizontal plane, said driving means being operative to move said cradle through said aperture and under said second portion whereby elevation of said cradle causes the same to pass upwardly through said pair of slots and pick up a pin overlying said slots the elevation of said cradle causing the connection between said cradle and said arm means to pass upwardly through said arcuate slot.

6. A bowling pin spotting machine in accordance with claim 5 wherein said arm means is pivoted in a yoke mounted for rotative movement about a vertical axis, and said driving means includes a cam operatively connected to move said cradle toward the rear of said plate means to bring said cradle into alignment with said aperture.

7. In a bowling pin spotting machine for use with a bowling alley having a pit at one end thereof, the combination of a conveyor in said pit for moving pins toward the rear thereof; plate means extending across said pit at the rear of said conveyor for limiting rearward movement of pins in the pit, a pin receiving station located in front of and adjacent to the center of said plate means; shuttle means reciprocable transversely of said pit and operative to deliver pins into said pin receiving station; a pin discharge station located above said pin receiving station, said stations lying in a vertical plane; and a pin elevator for elevating pins from said pin receiving station to said pin discharge station and including a single pin holder operative to pick up all of the pins one at a time at said pin receiving station and to discharge such pins at said pin discharge station, and driving means operatively connected to said pin holder to move the same between stations, said driving means being further connected to said shuttle means for moving said shuttle means in timed relationship relative to movement of said pin holder whereby a pin is delivered to said pin receiving station each time said pin holder is moved therethrough.

8. A bowling pin spotting machine in accordance with claim 7 including stationary plow means mounted in front of said shuttle means and operative to direct pins toward the rear center of said conveyor.

9. In a bowling pin spotting machine for use with a bowling alley having a pit at one end thereof, the combination of a first plate extending transversely across said pit toward the rear thereof and lying in a horizontal plane for supporting bowling pins thereon; a second plate extending across said pit and lying in a vertical plane for limiting rearward movement of bowling pins, said second plate being spaced to the rear of said first plate; a pin receiving station located approximately at the centers of said plates in front of said second plate and on top of said first plate; shuttle means reciprocable transversely of said pit adjacent to said plates and operative to deliver pins to said pin receiving station; and pin elevating means operatively connected for elevating pins from said pin receiving station to said pin discharge station.

10. The bowling pin spotting machine in accordance with claim 9 wherein said pin elevating means includes a horizontal, generally U-shaped cradle adapted to support a pin between the legs thereof so that the pin extends generally transversely of the pit, and said plates are suitably slotted whereby said cradle is moved from the rear of said second plate to the front thereof to a position underlying said first plate and thence from this position in a vertical direction so as to pick up a pin at said pin receiving station on said cradle.

11. A bowling pin spotting machine in accordance with claim 10 and including a pin kickoff means mounted adjacent to said discharge station and lying in the path of movement of a pin as it is being elevated by said cradle and operative to transfer such pin from said cradle to said discharge station as said cradle moves substantially through its apogee of movement.

12. A bowling pin spotting machine in accordance with claim 9 and including arm means supporting said cradle, said arm means being arranged in the form of a parallelogram and being pivotally connected for movement in a vertical plane to a yoke, said yoke being mounted for rotative movement about a vertical axis.

References Cited in the file of this patent

UNITED STATES PATENTS

| | | |
|---|---|---|
| 1,375,835 | Fairchild | Apr. 26, 1921 |
| 1,524,241 | Hedenskoog | Jan. 27, 1925 |
| 2,709,591 | Parry | May 31, 1955 |
| 2,726,086 | Patterson et al. | Dec. 6, 1955 |
| 2,767,983 | Holloway et al. | Oct. 23, 1956 |
| 2,902,282 | Troiano | Sept. 1, 1959 |
| 2,944,818 | Wells | July 12, 1960 |

FOREIGN PATENTS

| | | |
|---|---|---|
| 928,696 | Germany | June 10, 1955 |